N. W. STORER.
SYSTEM OF CONTROL.
APPLICATION FILED SEPT. 9, 1915.
1,289,301.
Patented Dec. 31, 1918.
2 SHEETS—SHEET 1.
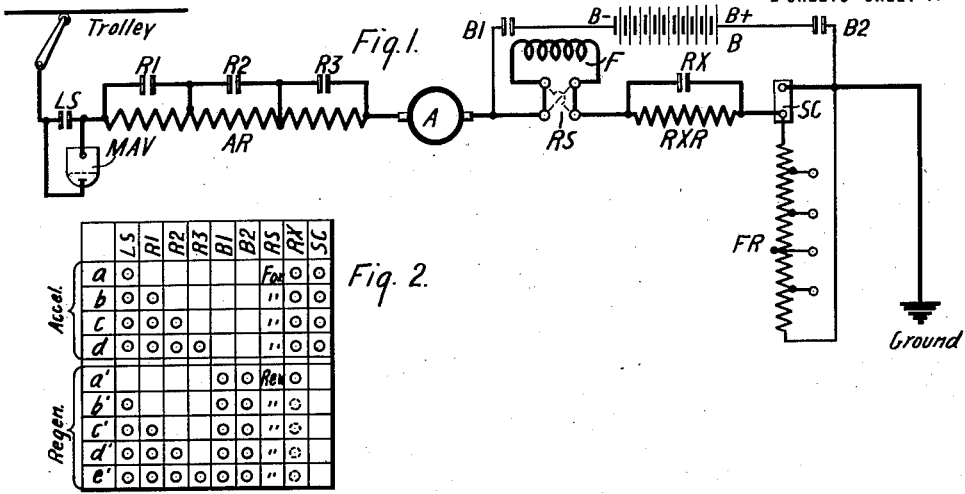
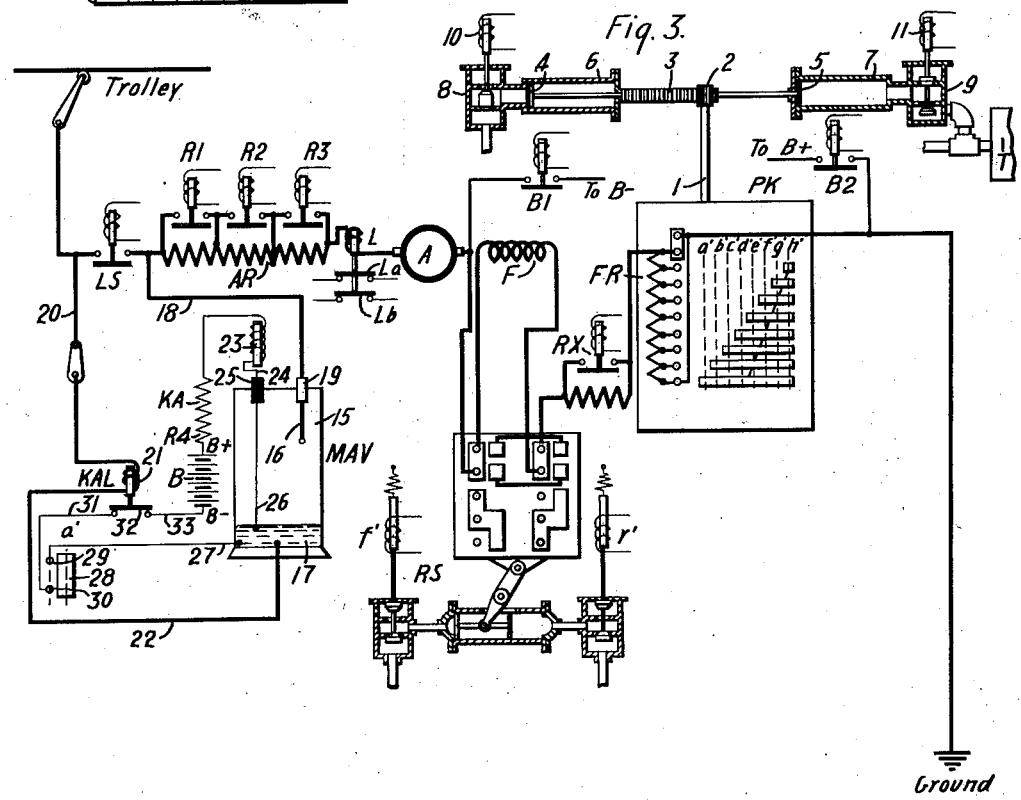
WITNESSES:
Fred A. Lind
W. R. Coley
INVENTOR
Norman W. Storer
BY
Wesley G. Carr
ATTORNEY

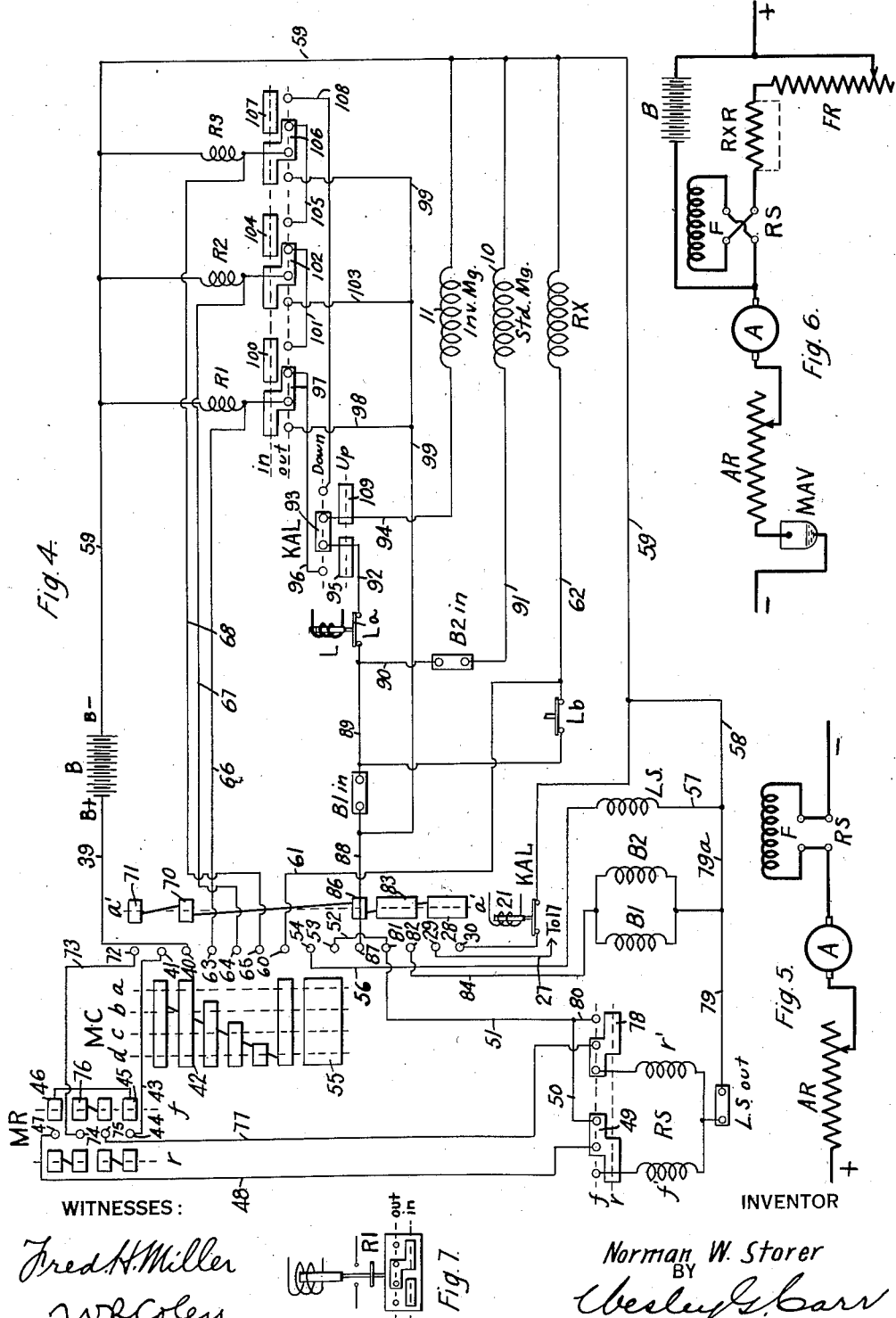

UNITED STATES PATENT OFFICE.

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,289,301.   Specification of Letters Patent.   Patented Dec. 31, 1918.

Application filed September 9, 1915. Serial No. 49,768.

*To all whom it may concern:*

Be it known that I, NORMAN W. STORER, a citizen of the United States, and a resident of Pittsburgh, in the county of Allegheny and State of Pennsylvania, have invented a new and useful Improvement in Systems of Control, of which the following is a specification.

My invention relates to systems of control, and it has special reference to the regenerative control of electric motors that are adapted for the propulsion of electric railway vehicles and the like.

One object of my invention is to provide, in a system of the above indicated-character, means which shall be relatively simple and inexpensive in construction and effective and reliable in operation, whereby the initial regenerative connection of the momentum-driven machines to the supply circuit and the subsequent transition from regenerative operation to coasting motor operation at a relatively low vehicle speed shall be effected in a relatively smooth manner without subjecting the apparatus to any injurious shocks.

Another object of my invention is to provide means for beginning regenerative operation of an electric motor at the precise instant that its regenerated voltage exceeds the voltage of the supply circuit by a predetermined amount and for opening the regenerative circuit at the precise instant that the regenerated voltage decreases below such predetermined value at the end of the regenerative period, whereby substantially every foot-pound of energy that it is possible to deliver to the supply circuit is returned thereto, no delays being encountered by reason of the operation of relays or such devices.

A further object of my invention is to provide means, in a system of the class under consideration, whereby, during the unavoidable fluctuations of the supply-circuit voltage, a reversal of current through the armature or field winding of the regenerating machine, by reason of a sudden increase of the supply-circuit voltage above the simultaneously - regenerated machine voltage, shall be automatically prevented, thus precluding the possibility of flash-over conditions in the regenerating machine.

In the prior art, considerable difficulty has been experienced in the regenerative control of direct-current motors by reason of the ever-present liklihood of sudden and relatively large fluctuations in the supply-circuit voltage which cause sudden changes in the load of the regenerating machine and tend to produce flash-over conditions in the machine. Such conditions are especially liable to occur in case the supply-circuit voltage suddenly exceeds the regenerated voltage of the machine by reason of the sluggishness of operation of the system governing the regenerating machine. In such case, the machine current is suddenly reversed, thus tending, in some cases, to weaken the field excitation of the machine, and a current of sufficiently high value may traverse the field or armature winding in the reversed direction to cause injurious flashing in the machine.

According to my present invention, I obviate the above-mentioned difficulties by introducing a circuit-breaker, comprising specifically a mercury-arc valve, in series relation with the regenerative circuit of the momentum-driven machine, in such a manner that current may readily pass from the machine to the supply circuit whenever the regenerated voltage exceeds the supply-circuit voltage by an amount sufficient to overcome the voltage drop in the mercury arc, but the traversal of current in the opposite and undesirable direction is immediately and automatically prevented by the well-known check-valve characteristic of the mercury-arc valve. The use of such a device will avoid the employment of prior relatively sluggishly-acting relays, that are connected in a complicated manner, for closing and opening the regenerative circuit at the proper times. I provide also means for independently varying the field excitation of the regenerating machine, whereby its voltage is initially gradually raised to the above-mentioned value above that of the supply-circuit voltage, whereupon the mercury-arc valve immediately effects connection of the machine to the supply circuit, an auxiliary "keep-alive" circuit being previously provided so that the main regenerative circuit may be closed immediately upon the attainment of the proper relative voltage conditions. When the speed of the regenerating machine has decreased to a relatively low value and the field excitation has been increased to its maximum value, so that the voltage of the regenerating machine no longer remains the predetermined amount above the supply-circuit voltage, the regenerative circuit is immediately and automatically opened, since the mercury-arc valve prevents the flow of current in the reversed direction.

In the accompanying drawings, Figure 1 is a simplified diagrammatic view of the main circuits of a system of control embodying my invention, such main circuits being shown in complete diagrammatic form in Fig. 3; Fig. 2 is a sequence chart of a well-known type for indicating the predetermined sequence of operation of the various switches that are illustrated in the systems shown in Fig. 1 and Fig. 3; Fig. 4 is a diagrammatic view of the auxiliary governing circuits for manipulating the various main-circuit switches in accordance with the sequence chart of Fig. 2; Fig. 5 and Fig. 6 are diagrammatic views respectively showing, in the simplest manner, the main-circuit connections during acceleration and regeneration; and Fig. 7 is a detail diagrammatic view of one of the main-circuit switches that are partially illustrated in Fig. 3.

Referring to Fig. 1 and Fig. 3 of the drawing, the system shown comprises a plurality of suitable supply-circuit conductors respectively marked trolley and ground; a dynamo-electric machine having an armature A and a series-connected field-magnet winding F; a reversing switch RS of a familiar electrically-controlled type for reversing the electrical relations of the armature A and the field winding F; an accelerating resistor AR, the sections of which are respectively adapted to be short-circuited by switches R1, R2 and R3, an auxiliary resistor RXR that is adapted to be short-circuited by a switch RX throughout acceleration and intermittently short-circuited during regeneration; and automatically-operated switching device or drum controller PK that is adapted to suitably vary a field-circuit resistor FR during regenerative operation; a short-circuiting switch SC for short-circuiting the resistor FR during the accelerating period of the machine; a suitable source of energy, such as a storage battery B, that is adapted to be connected in parallel relation to the series-connected field-magnet winding F and the field-regulating registor FR by the closure of a plurality of switches B1 and B2 during regeneration; a limit switch L of a familiar type that has its actuating coil disposed in series relation with the main machine and is provided with a plurality of movable contact members for a purpose to be described; a main-circuit switch LS that is employed during acceleration to connect the machine to the positive supply-circuit conductor; and a mercury-arc valve MAV that is connected in parallel relation to the switch LS and is substituted therefor during the regenerative period, in accordance with my invention.

The automatically-operated switching device or controller PK comprises a plurality of contact segments and control fingers that are associated with the field-regulating resistor FR to vary the active amount of the resistor in circuit as the controller, preferably of the drum type, is moved through its successive operative positions $a'$ to $h'$, inclusive, and an electrically-controlled pneumatically-operated, mechanism for effecting rotative movement of the controller.

The operating mechanism comprises a suitable shaft member 1 that is centrally associated with the controller; a pinion 2 that is secured to the upper end of the shaft 1; a rack member 3 that is adapted to mesh with the pinion 2 and has its respective ends provided with piston members 4 and 5; a plurality of suitable operating cylinders 6 and 7 for the pistons 4 and 5; a plurality of pneumatic valve members 8 and 9 that are respectively adapted to admit fluid pressure to the cylinders 6 and 7 from a suitable tank or reservoir T under predetermined conditions; and a plurality of actuating coils 10 and 11 for the valves 8 and 9, respectively.

The valve 8 is normally closed to exclude fluid pressure from the cylinder 6, while the other valve 9 is normally open to permit the access of fluid pressure to the cylinder 7, whereby the pistons and the control drum are biased to their extreme left positions, as shown in the drawing. To effect the step-by-step actuation of the control drum, the actuating coils 10 and 11 are simultaneously energized, whereby fluid pressure is admitted through the valve 8 to the cylinder 6, while pressure is exhausted from the cylinder 7 through the valve 9 to the atmosphere. To arrest the movement of the control drum at any point, the actuating coil 11 is deënergized, whereby balanced-pressure conditions obtained in the cylinders 6 and 7, and the control drum is immediately and positively brought to rest in its desired operative position. To effect the return of the control drum to its off position, it is merely necessary to deënergize the two actuating coils 10 and 11, whereby fluid pressure is admitted to the cylinder 7 and is excluded from the cylinder 6 to effect the backward movement of the control drum to the position shown in the drawing.

The mercury-arc valve MAV comprises a suitable incasing member or tank 15 with which is suitably associated a conducting member 16 that is adapted to act as an anode, and which tank is adapted to contain a suitable pool of mercury 17 that acts as a cathode of the mercury-arc valve, in accordance with familiar principles; and a "keep-alive" circuit KA, of a familiar type, that is adapted to inaugurate the operation of the mercury-arc valve in a well-known manner, so that the main anode 16 and the common cathode 17 will be joined by an arc of mercury vapor when voltage conditions are proper.

The anode 16 is suitably electrically connected to the lower-voltage terminal of the switch LS by a conductor 18 that extends through a suitable insulating bushing 19 in the incasing member 15 of the valve. The circuit of the cathode 17 comprises a conductor 20 that is connected to the higher-voltage terminal of the switch LS, the actuating coil 21 of a relay device KAL, and conductor 22, which is directly connected to the pool of mercury 17.

The "keep-alive" circuit KA comprises the battery B or some other suitable source of energy; a permanent resistor R4; an actuating coil 23 that is adapted to govern the operation of a conductor 24; a suitable insulating bushing 25 in the incasing member 15 which bushing loosely surrounds the conductor 24; and an auxiliary anode 26 that is electrically secured thereto and has one end disposed just beneath the surface of the mercury pool 17 when the coil 23 is deënergized, corresponding to the upper or open position of the relay device KAL. The "keep-alive" circuit is completed through conductor 27 that is directly connected to the mercury pool 17; contact segment 28 that is adapted to bridge control fingers 29 and 30 in position $a'$ of the master controller MC that is to be described in connection with Fig. 4; conductor 31; the coöperating stationary and movable auxiliary contact members 32 of the relay device KAL; and conductor 33 to the negative terminal of the battery B.

The operation of the "keep-alive" circuit, with respect to the regenerative operation of the system, may be set forth as follows: When the actuating coil 23 of the conductor 24 and the auxiliary anode 26 is energized by the movement of the master controller to position $a'$ simultaneously with the occupation of its lower or closed position by the relay device KAL, the auxiliary anode is raised above the surface of the mercury pool 17, whereby an auxiliary or starting mercury arc is formed between the surface of the mercury pool and the auxiliary anode 26.

As soon as the voltage of the momentum-driven dynamo-electric machine is increased a suitable amount above the supply-circuit voltage in the manner to be described, the main mercury arc immediately forms between the surface of the mercury pool 17 and the main anode 16, whereby the regenerative connection of the machine to the supply circuit is immediately effected. Consequently, current traverses the actuating coil 21 of the relay device KAL which is raised to its upper or open position, whereby the actuating coil 23 of the auxiliary anode 26 is deënergized and the anode drops to the position shown in the drawing. However, the "keep-alive" circuit is in instant readiness to repeat the cycle just described as soon as the relay device KAL again drops to its lower or closed position, that is to say, as soon as the regenerated current is interrupted for any reason.

The main reversing switch RS is shown as comprising a plurality of actuating coils $f'$ and $r'$ that are respectively associated with suitable pneumatic valves and a common operating cylinder for manipulating the reversing switch contact-carrying member to the one or the other of its operative positions that respectively correspond to forward and reverse operation of the main machine, as will be understood.

Reference may now be had to Fig. 4, wherein the auxiliary governing system shown comprises the actuating coils for the controller PK and for the various main-circuit switches that are illustrated in Fig. 3; a master controller MC that is adapted to occupy a plurality of operative positions $a$ to $d$, inclusive, when operated in one direction that corresponds to manually-governed acceleration of the machine and is adapted to occupy a single position $a'$ when operated in the opposite direction that corresponds to automatic regenerative operation of the machine; a master reverser MR that is adapted to occupy a plurality of positions $f$ and $r$ which respectively correspond to forward and reverse operation of the main machine and is associated with the actuating coils $f'$ and $r'$ of the main reversing switch RS in a familiar manner; and a suitable source of energy, such as the battery B, for energizing the various actuating coils. A plurality of well-known electrical interlocking members is illustrated in Fig. 4, such members being associated with, and adapted to be actuated by, the various main-circuit switches in a familiar manner that is illustrated in Fig. 7 in connection with switch R1. It is believed to be unnecessary to completely illustrate all of the main-circuit switches together with all of the corresponding interlocks.

Assuming that it is desired to accelerate the machine and that the master reverser MR and the main reversing switch RS occupy their respective forward positions, the master controller MC may be moved to its initial position $a$, whereby a circuit is first established from the positive terminal B+ of the battery B, through conductor 39, control fingers 40 and 41, which are bridged by contact segment 42 of the master controller, conductor 43, control finger 44, contact segments 45 and 46, and control finger 47 of the master reverser MR, conductor 48, contact member 49 of the reversing switch RS, conductors 50, 51 and 52, control fingers 53 and 54, which are bridged by contact segment 55 of the master controller, conductor 56, the actuating coil of the switch LS, and conductors 57, 58 and 59 to the negative terminal B— of the battery B.

Another circuit is simultaneously established from the contact segment 42, through control fingers 60, conductors 61 and 62 and the actuating coil of the switch RX to the negative conductor 59. Inasmuch as the short-circuiting switch SC is permanently closed during acceleration of the machine, the main-circuit connections at this time comprise the switch LS, the entire accelerating resistor AR, the armature A and the field winding F.

As the master controller is moved through positions $b$, $c$ and $d$, control fingers 63, 64 and 65 successively engage the contact segment 42, whence circuits are respectively completed through the actuating coils of the switches R1, R2 and R3 to the negative conductor 59. The machine is thus accelerated, in accordance with a familiar practice, by manual control.

Assuming that it is then desired to effect the regenerative operation of the system, the master controller may be moved to its regenerative position $a'$, whereby a circuit is first established from the positive terminal of the battery B, through the conductor 39, the control finger 40, contact members 70 and 71 and control fingers 72 of the master controller, conductor 73, control fingers 74 and 75, which are bridged by contact segment 76 of the master reverser when maintained in its forward position, conductor 77, contact member 78 of the reversing switch RS in its forward position, the actuating coil $r'$ of the reversing switch, interlock LS—out, and conductors 79 and 79a to the negative conductor 58. The reversing switch RS is thus actuated to its reversed position to effect the reversal of the electrical relations of the field winding F and the armature A for a well-known purpose, and without requiring any other manipulation than the actuation of the master controller to its position $a'$.

As soon as the reversing switch RS occupies its reversed position, a further circuit is established from the contact segment 78 thereof, through conductors 80 and 51, control fingers 81 and 82, which are bridged by contact segment 83 of the master controller, conductor 84, the parallel-connected actuating coils of the switches B1 and B2 and the conductor 79ª to the negative conductor 58. In this way, the battery B is connected in parallel relation to a circuit comprising the series-connected field-magnet winding F, the resistor RXR and the short-circuited field-regulating resistor FR.

Upon the closure of the switches B1 and B2, a circuit is established from an energized contact segment 86 of the master controller, through control finger 87, conductor 88, interlock B1—in, conductors 89 and 90, interlock B2—in, conductor 91 and the actuating coil 10 of the controller PK to the negative conductor 59. Another circuit is simultaneously established from conductor 89, through the stationary and movable coöperating contact members L$a$ of the limit switch L, conductor 92, interlock 93—KAL—down, conductor 94, and the other actuating coil 11 of the PK controller.

Since both actuating coils of the controller are thus energized, movement thereof through its various operative positions begins, to first remove the short-circuit by the switch SC and then to gradually decrease the active amount of the field-regulating resistor FR to correspondingly increase the excitation of the field winding F and build up the voltage of the momentum-driven armature A. It will be understood that the "keep-alive" circuit KA is completed as soon as the master controller MC is actuated to its position $a'$ by the engagement of the control fingers 29 and 30 with the contact segment 28, as already described in connection with Fig. 3. When the PK controller has excluded a sufficient portion of the field-regulating resistor FR from circuit to cause the voltage of the armature A to be increased above the supply-circuit voltage by an amount sufficient to overcome the voltage drop in the mercury arc, the regenerative circuit is immediately completed through the mercury-arc valve MAV in the manner hereinbefore described, and the "keep-alive" circuit KA is opened, as already set forth.

At the instant of connection of the machine circuit to the supply circuit, the limit switch L will be raised to break connection between the removable contact member L$b$ of the limit switch L and the conductor 62, whereby the actuating coil of the switch RX is deënergized, and the resistor RXR is inserted in circuit to reduce the initial flow of regenerative current. Similarly, at other times during the regenerative operation, when the limit switch L lifts, the resistor RXR is introduced in circuit to prevent relatively large increases in current, and the actuating coil of the switch RX is energized when the limit switch L again drops to effect the temporary short-circuit of the resistor RXR.

The switch RX may be governed by a separate limit switch, set to operate only at a relatively heavy current, if desired, as set forth in my co-pending application, Serial No. 829,439, filed April 4, 1914.

The raising of the relay device KAL serves to complete a circuit including the conductor 89, the auxiliary contact members La of the limit switch L when the regenerative current has decreased to a value sufficient to allow the limit switch to drop to its lower position, conductor 92, interlock 95—KAL—up, conductor 96, interlock 97—R1—out and the actuating coil of the switch R1 to the negative conductor 59. Upon the closure of the switch, a holding circuit for its actuating coil is formed comprising interlock 97—R1—in, conductor 98 and conductor 99 which is directly connected to the positively energized conductor 88.

As soon as the limit switch L has again dropped to its lower position, a circuit is completed from conductor 96 through interlock 100—R1—in, conductor 101, interlock 102—R2—out and the actuating coil of the switch R2 to the negative conductor 59. A holding circuit for the actuating coil of the switch is then formed comprising interlock 102—R2—in and conductor 103 which is connected to the conductor 99.

When the limit switch L has again reached its lower position a circuit is completed from conductor 101, through an interlock 104—R2—in, conductor 105, interlock 106—R3—out and the actuating coil of the switch R3 to the negative conductor 59. A holding circuit for the actuating coil of the switch R3 includes interlock 106—R3—in and the conductor 99.

The closure of the switch R3 effects the establishment of a circuit from conductor 105, through interlock 107—R3—in, conductor 108, interlock 109—KAL—up and conductor 94 to the actuating coil 11 of the PK controller.

Both actuating coils of the PK controller being again energized, movement thereof through its successive steps occurs in accordance with the operation of the limit switch L until the final position $h'$ of the controller is reached. When the regenerated voltage of the main machine subsequently decreases to a value below the supply-circuit voltage plus the voltage consumed by the mercury arc, the regenerative circuit is immediately opened by reason of the familiar check-valve action of the mercury-arc valve, and the regenerative operation is completed.

The mercury-arc valve MAV further functions to immediately open the regenerative circuit in case fluctuations of the supply-circuit voltage bring about a condition where the regenerated voltage is momentarily less than the combined voltages of the supply circuit and the mercury arc, which tends to reverse the armature and field-winding current and to cause flash-over conditions, in the manner hereinbefore set forth.

The main-circuit connections during the accelerating period of the machine are illustrated in a simple manner in Fig. 5, while the main-circuit regenerative connections are similarly illustrated in Fig. 6.

I thus provide a system of regenerative control wherein the connection of the regenerating circuit to the supply circuit is effected immediately upon the attainment of proper voltage conditions between the machine and the supply circuit, and the flow of regenerative current is maintained until the regenerated voltage drops below the proper value when the machine has reached a relatively low speed, whereby the traversal of the current in the opposite direction is immediately and automatically prevented by the action of the mercury-arc valve.

Moreover, the action of the mercury-arc valve in preventing flash-over conditions in the machine by reason of the unavoidable fluctuations of the supply-circuit voltage, is a valuable feature of my invention, as will be appreciated by those skilled in the art. It will be observed that, upon a relatively short interruption of the regenerative current by the mercury-arc valve, the operation of the PK controller will be continued at a predetermined rate by reason of the assumption of its lower position by the limit switch L, whereby when the regenerative current again traverses the circuit, the excitation of the field winding F will be at least strong enough to provide the proper regenerative conditions; and the regenerative operation will thus be continued to the point of relatively low speed above referred to, irrespective of the voltage fluctuations in question.

Obviously, my invention is not restricted to any particular type of regenerative system, but is readily applicable to either self-excited or separately-excited regenerating machines, or to a combination system, such as that illustrated.

It will be understood that, although I have specifically illustrated and described my invention in connection with a mercury-arc valve, any equivalent thereof may be employed, if desired. For example, a sodium-arc or potassium-arc or other vapor-arc valve, or, in fact, any asymmetric conductor or asymmetric unit may be utilized to provide the desired check-valve characteristic.

I do not wish, therefore, to be restricted to the specific circuit connections or arrangement of parts herein set forth, as various modifications thereof may be made within the spirit and scope of my invention, but I desire that only such limitations shall be imposed as are indicated in the appended claims.

I claim as my invention:

1. In a system of regenerative control, the combination with a supply circuit, and a dynamo-electric machine, of means for arranging the machine circuits for both accelerating and regenerating operation, and a vapor-arc valve for connecting said supply circuit and said machine during regenerative operation thereof to permit the flow of the maximum available continuous regenerative current to the supply circuit and automatically prevent the flow of accelerating current from the supply circuit to the regenerating machine.

2. In a system of regenerative control, the combination with a direct-current supply circuit, and a dynamo-electric machine having an armature and a series field-magnet winding, of a mercury-arc valve; and means for connecting the cathode thereof to the positive supply-circuit conductor, means for connecting the anode thereof to the dynamo-electric machine circuit and means for reversing the electrical relations of the armature and field winding during regenerative operation, whereby the regenerated current may flow through the reversed field winding and the mercury-arc valve to the supply-circuit but traversal of current in the opposite direction and consequent flash-over conditions are automatically prevented by the check-valve action of the mercury-arc valve.

3. In a system of regenerative control, the combination with a direct-current supply-circuit, and a dynamo-electric machine having an armature and a reversible field magnet winding, of a variable resistor, an auxiliary source of energy, a mercury-arc valve; means for effecting the following connections during regeneration; connecting said resistor in series relation with the reversed field winding, connecting said source of energy across the field winding and resistor, connecting the cathode of said mercury-arc valve to the positive supply-circuit conductor, and connecting the anode thereof to the dynamo-electric machine circuit; an auxiliary "keep-alive" circuit for said mercury-arc valve, and means for regulating said variable field-circuit resistor, whereby the instant that the voltage of the momentum-driven machines exceeds the supply-circuit voltage, regenerative operation through said valve is permitted, and the instant the regenerative voltage is exceeded by the supply-circuit voltage, the machine circuit is opened by the check-valve action of the mercury-arc valve.

4. In a system of regenerative control, the combination with a direct-current supply-circuit, and a dynamo-electric machine having an armature and a reversible field-magnet winding, of a variable resistor, an auxiliary source of energy, a mercury-arc valve; means for effecting the following connections during regeneration: connecting said resistor in series relation with the reversed field winding, connecting said source of energy across the field winding and resistor, connecting the cathode of said mercury-arc valve to the positive supply-circuit conductor, and connecting the anode thereof to the dynamo-electric machine circuit; an auxiliary "keep-alive" circuit for said mercury-arc valve, a master controller for the system embodying contact members adapted to be included in said "keep-alive" circuit during regeneration, a relay device having its actuating coil disposed in the main regenerative circuit and having its contact members adapted to close the "keep-alive" circuit during deënergization of the device, and means for regulating said variable field-circuit resistor, whereby the instant that the voltage of the momentum-driven machines exceeds the supply-circuit voltage, regenerative operation through said valve is permitted, and the instant the regenerative voltage is exceeded by the supply-circuit voltage, the machine circuit is opened by the check-valve action of the mercury-arc valve.

5. In a system of regenerative control, the combination with a direct-current supply circuit, a dynamo-electric machine, and means for connecting said machine for operation as a motor and as a generator, of an asymmetric device, and means for connecting the cathode thereof to the positive supply-circuit conductor and for connecting the anode thereof to the machine circuit in order to permit a flow of regenerated current to the supply circuit and prevent the flow of accelerating current when said machine is connected for operation as a generator.

In testimony whereof I have hereunto subscribed my name this 31st day of Aug., 1915.

NORMAN W. STORER.